Oct. 14, 1958

R. J. KOPE 2,855,817

PROJECTILE FASTENER FOR PENETRATION INTO MATERIALS
OF VARYING RESISTANCE TO PENETRATION

Filed Feb. 1, 1954

INVENTOR:
ROWLAND J. KOPF,

BY Bruninga and Sutherland,

ATTORNEYS.

Oct. 14, 1958 R. J. KOPE 2,855,817
PROJECTILE FASTENER FOR PENETRATION INTO MATERIALS
OF VARYING RESISTANCE TO PENETRATION
Filed Feb. 1, 1954 2 Sheets-Sheet 2

INVENTOR;
ROWLAND J. KOPF,
BY Bruninga and Sutherland,
ATTORNEYS.

United States Patent Office

2,855,817
Patented Oct. 14, 1958

2,855,817

PROJECTILE FASTENER FOR PENETRATION INTO MATERIALS OF VARYING RESISTANCE TO PENETRATION

Rowland Joseph Kopf, Rocky River, Ohio, assignor, by mesne assignments, to Olin Mathieson Chemical Corporation, a corporation of Virginia Application February 1, 1954, Serial No. 407,266

1 Claim. (Cl. 85—10)

This invention relates generally to penetrating fasteners of the type driven by powder-actuated tools, and more particularly, to multipurpose fasteners that may be set in various types of work material.

It will be understood that a powder-actuated tool utilizes a blank cartridge to embed a fastener or similar element within structural material that is otherwise difficult or inconvenient to penetrate. Such materials as steel plate, concrete, wood and sheet aluminum, differ in their resistance to penetration, hence while it is desirable to employ a given tool, fastener and cartridge for all applications, this has not been feasible. A cartridge having the power to embed a fastener in steel plate may drive that fastener entirely through a lighter gauge metal or weaker material.

This problem has been overcome in part by providing different types of fasteners and cartridges of varying power, but these expedients complicate the task of the operator in that he must stock a considerable variety of components and select the proper combination from them for each job. Another practice is that of placing a thin, metal plate between the tool and the work material so that some of the propelling energy of the fastener is consumed in rupturing this member. Such members, when available in varying thickness and hardness, permit the operator to exercise some degree of control over penetration without changing the fastener or cartridge, but the operator still faces the difficulty of selecting an arresting element of proper strength for each particular job. It may be noted that the effect of such a rupturable plate is like that of a reduction in powder charge, there being little, if any, affect upon penetration once the fastener enters the work material. Consequently, an arresting element of this type may perform well in one job and be entirely unsatisfactory in another job.

It is accordingly an object of the invention to provide improved cartridge-driven fasteners, and specifically, to provide a set of parts that will perform satisfactorily in various types of work material. Briefly, I propose the use of a perforated arresting element in combination with a fastener body having an elongate shank section of substantially uniform cross section, the perforation being of a size but slightly less than that of the shank section. With this combination, the arresting action of the perforated member is spread more uniformly along the length of the fastener, and hence is proportionate to the depth of penetration, and thereby to the strength of the work material. As such, the combination performs as well on weak work materials as on strong material, there being little arresting action when penetration is slight, as in steel, and considerable braking action being developed when the penetration is deep, as in wood.

The arresting element may be provided as a separate item for use at the muzzle end of the tool, or it may be carried by the fastener to guide it during movement through the barrel. The cooperating shank portion of the fastener may be of uniform diameter throughout its length, slightly tapered, or may be formed in sections of different diameter; and this shank portion may be of varying finish. For example, the fastener may have a smooth shank section followed by a knurled section of relatively larger cross section, and the opening in the arresting element may be of a size such as to develop braking action only with the knurled section of the fastener. The smoothly finished section then embeds firmly in steel without arresting action, whereas the knurled section cooperates with the arresting element to limit penetration in a softer material.

Other features of the invention will be in part apparent from and in part pointed out in the following detail description taken in connection with the accompanying drawings, in which.

Initially, it will be understood that in a powder-actuated tool for driving fasteners and the like, there is a barrel which receives the fastener and a blank cartridge. The fastener is an elongate member pointed at its forward end and perhaps provided with a gas check at its other end. In fastening an item to a relatively fixed structure, the muzzle of the gun is placed against the item to be fastened, and upon firing of the cartridge, the fastener is driven through the item and into the fixed structure.

The depth of penetration into the fixed structure will necessarily depend upon the resistance offered thereby and upon the driving force behind the fastener. For example, where the arresting force is entirely that of the resistance of the work material, a fastener that would partly embed in one material might pass completely into or through a weaker material.

Variations in the resistance offered by different materials may be compensated somewhat by the use of different charges of powder. In other cases, where the arresting force of the structural material is inadequate, the fastener may be provided with an enlarged head near its rear end, which will engage with the surface of the fastened section. It is also a practice in some instances to place a thin, metal plate between the barrel muzzle and work, the plate being ruptured by the fastener upon operation of the tool. In being punctured, the plate absorbs a part of the kinetic energy of the moving fastener, thereby affording some control of the depth of penetration.

The arresting qualities of such a plate, however, are not entirely satisfactory. Indeed, the effect of the plate is about the same as that obtained by reducing the charge of propellant. This is so because the arresting force is developed substantially instantaneously, the force rising to a peak just before the disk ruptures, and then falling off rapidly or disappearing entirely. The action may be likened to that of a punch operating on steel plate, where after a predetermined slight deformation, the plate suddenly fractures in shear. Hence, while it is possible to control penetration by using plates of differing thickness and hardness, the procedure is relatively critical. The problem is especially acute when dealing with a material such as wood, which offers little resistance.

I have discovered that a much more satisfactory control over penetration is obtained if the disk is initially punctured and then used with a fastener having an elongate shank section of slight larger diameter than that of the perforation. The size of this opening in comparison with that of the cooperating part of the fastener preferably is such that deformation of the arresting element is within the elastic limit of the material from which it is made, the arresting action thereby being more uniformly spread out along the fastener.

Figure 1:
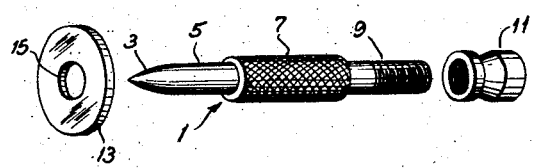
Fig. 1 is an exploded view of certain fastener components embodying the invention.

Referring now to the drawings, Fig. 1 illustrates a preferred embodiment, wherein the fastener body 1 includes a pointed nose 3 leading to a smooth cylindric shank section 5, which is followed by a knurled shank section 7 of slightly larger cross section. The base end 9 of the body 1 is threaded for reception of an elongate sabot 11, which guides the fastener within the tool barrel. The sabot additionally acts as a gas check during firing and as a head limiting penetration after firing. Normally the fastener would be supplied with the sabot 11 screwed onto the body 1.

In accordance with this invention, an arresting element 13 is used with the fastener to control penetration. This element 13 may be of varying form, and in the embodiment disclosed in Fig. 1, is in the shape of a washer, the central perforation 15 of which is of a diameter slightly greater than that of the smooth shank section 5, so as to have a free fit therewith, but of a diameter slightly less than that of the shank section 7, so as to produce a tight fit. The difference in size between the opening 15 and shank 7, however, preferably is not so much as to result in even partial fracture of the element 13 when the fastener body is driven therethrough. Such arresting elements may be made in varying thickness and of different materials, steel in thicknesses of about one-eighth inch being satisfactory.

Figure 2:
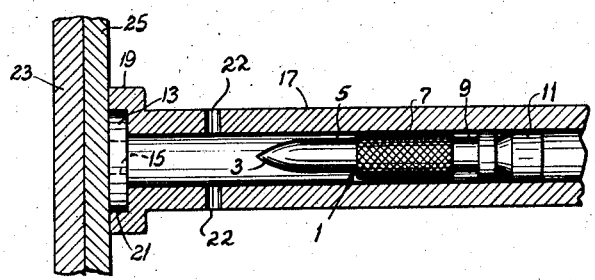
Fig. 2 is a sectional view illustrating a portion of the tool barrel and work material prior to penetration.
Figure 3:
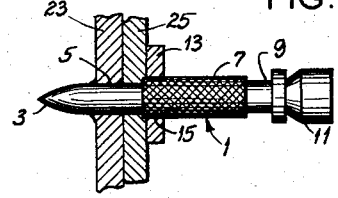
Fig. 3 is a sectional view illustrating the character of penetration when the Fig. 1 fastener is embedded in steel plate.

Referring to Fig. 2, the fastener body 1 is shown within a tool barrel 17 back from the muzzle 19, which is enlarged and recessed at 21 to accommodate the arresting element 13. The tool is placed against the work surface, which in Fig. 2 comprises a steel plate 23 and an item 25 which is to be fastened to the plate. A blank cartridge (not shown) and the fastener are breech loaded and the arresting element is muzzle loaded. Upon firing, the fastener body 1 is driven down the barrel through the arresting element 13 and into the parts 23 and 25, as illustrated in Fig. 3, the gases venting around the fastener or through ports 22. With this system, it will be apparent that the opening 15 should be accurately centered with respect to the bore.

Where the tool is used to embed fasteners in steel plate, the penetration normally will be limited to the smooth shank section 3, as illustrated in Fig. 3. The knurled shank section 7 passes only partially through the arresting element 13, hence no arresting action is developed by the element 13 until after substantial penetration of the work by the shank section 5. Thereafter, as the element is driven back over the knurled surface 7, arresting action does occur, which has the advantageous feature of driving the parts 23 and 25 into close contact with one another.

Figure 4:
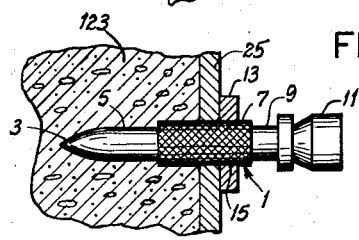
Fig. 4 is a view similar to that of Fig. 3, but showing the fastener embedded in concrete.

Referring now to Fig. 4, this same fastener combination may be utilized in relatively weaker material, as, for example, concrete 123. Such material offers less resistance to penetration, and in this case, the knurled shank section 7 penetrates the arresting element 13 and partially enters the concrete, thus insuring a firm connection. In this respect, it is to be understood that the arresting action of the element 13 is relatively prolonged. In other words, the effect of this element is more like that of an increase in the resistance of the work material to penetration, rather than like that of a reduction in the propelling force.

Figure 5:
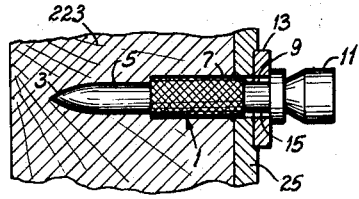
Fig. 5 is a view similar to that of Figs. 3 and 4, but showing the fastener embedded within wood.

Fig. 5 illustrates the use of the fastener with even weaker material, such as wood 223. In such instance, the shank portion of the fastener may be entirely embedded and the arresting element perhaps partly embedded, so that arresting action is not only provided by the frictional cooperation between the element 13 and shank portion 7, but also by the engagement of the sabot 11 with the element 13.

Figure 6:
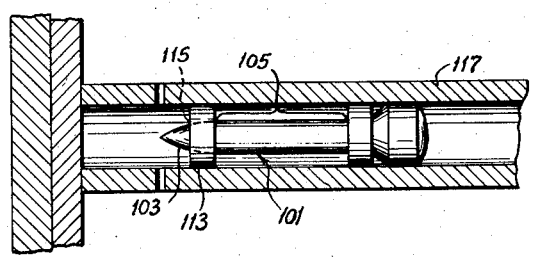
Fig. 6 is a view similar to that of Fig. 2, but illustrating an alternative embodiment of the fastener.

Whereas Figs. 1–5 illustrate an embodiment adapted in part to embed without arresting action, various modifications of the invention will be apparent. In Fig. 6, for example, there is shown a fastener body 101, the shank section 105 of which is smoothly finished and of uniform diameter along its entire length. In this instance, the arresting element 113 has an inner diameter 115 less than that of the smooth-finished shank, and arresting action begins almost immediately after penetration of the work material. Such an action is especially desirable in concrete, because it results in a compressive load being applied simultaneously with penetration, thereby tending to counteract the tendency of the work to disrupt, which would materially reduce holding power. Such pre-perforated elements also permit more accurate and predictable control over such compression.

Moreover, the arresting element 113 may be of an outer diameter such as to permit its reception within the barrel 117 of the tool. With this arrangement, the fastener may be supplied with the element 113 press-fitted over the pointed nose portion 103 of the body 101, thereby to facilitate handling in the field and to guide the front of the fastener in its movement through the barrel.

Figure 7:
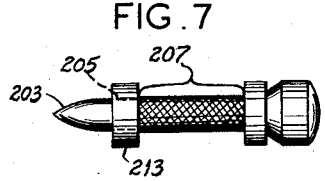
Fig. 7 is a plan view illustrating a modified form of the Fig. 6 fastener.

Fig. 7 illustrates an embodiment of the invention, wherein shank section 207 is knurled along substantially its entire length, an arresting element 213 being force-fitted over a short cylindric portion 205 up against the knurled section 207, and the nose 203 projecting forwardly of the element 213. The arrangement disclosed in Fig. 7 would perform similarly to that shown in Fig. 6, but would have superior holding power and greater braking action.

Figure 8:
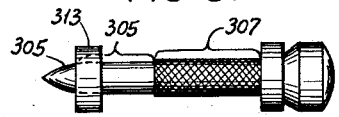
Fig. 8 is a plan view of an additional embodiment of the fastener.

The embodiment of Fig. 8 represents a combination of the Fig. 6 and Fig. 7 fasteners, in that arresting action begins substantially simultaneously with penetration of the work, but in this instance, the arresting element 313 fits tightly with a smoothly finished shank section 305 of substantial length and also with a knurled section 307 of slightly larger diameter. As in Fig. 6, the arresting element 313 may be press-fitted to the nose 303 of the fastener body.

Figure 9:
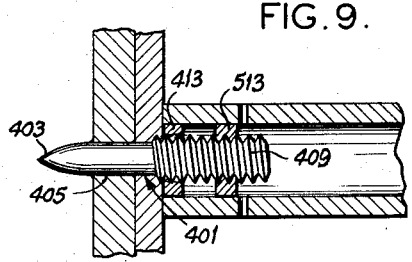
Fig. 9 is a view similar to that of Fig. 6, but showing still another form of fastener after penetration of the work material.

As a still further embodiment, Fig. 9 illustrates a simplified fastener, wherein the body 401 comprises a nose 403 and smooth shank 405, followed by a threaded base section 409 of considerable length. A pair of arresting elements 413 and 513 may be provided for cooperation with the threads 409, and the element 513 may be initially threaded back over the threads so as not to become effective as an arresting element until after considerable penetration has occurred.

From the foregoing description, it is apparent that those skilled in the art will understand the structure, function and mode of operation of the invention herein disclosed, and appreciate the advantages thereof. Although several embodiments have been disclosed in detail, it is to be understood that the invention is not limited thereto, but the drawings and description thereof are to be understood as being merely illustrative. It is realized that many modifications and variations will present themselves to those skilled in the art without departing from the spirit of this invention or the scope thereof as set forth in the appended claim.

Having thus described the invention, what is claimed and desired to be secured by Letters Patent is:

A fastener adapted for substantially adequate fastening penetration into materials of varying resistance to penetration without overpenetration by a powder-actuated tool having a barrel of predetermined bore size, comprising a penetrating element having a pointed nose followed by an elongate shank section of substantially uniform cross section, and a steel pre-perforated arresting element about one-eighth of an inch thick force fitted on said nose, said arresting element having a perforation with a diameter slightly less than that of said shank section whereby said arresting element is elastically expanded without substantial plastic deformation by penetration of said shank, so as to have a braking coaction with the shank, and having an external diameter slightly less than the diameter of said predetermined bore whereby said element can fit within said bore and guide said shank.

References Cited in the file of this patent

UNITED STATES PATENTS

| | | |
|---|---|---|
| Re. 23,569 | Sopris | Oct. 28, 1952 |
| 1,131,761 | Wheaton | Mar. 16, 1915 |
| 1,388,363 | Miller | Aug. 23, 1921 |
| 2,455,825 | Temple | Dec. 7, 1948 |
| 2,499,227 | Miles | Feb. 28, 1950 |
| 2,724,116 | Termet | Mar. 11, 1952 |
| 2,663,259 | Catlin et al. | Dec. 22, 1953 |
| 2,666,252 | Temple | Jan. 19, 1954 |
| 2,722,004 | Webber | Nov. 1, 1955 |
| 2,761,348 | Williams et al. | Sept. 4, 1956 |

UNITED STATES PATENT OFFICE
CERTIFICATE OF CORRECTION

Patent No. 2,855,817                                        October 14, 1958

Rowland Joseph Kopf

It is hereby certified that error appears in the above numbered patent requiring correction and that the said Letters Patent should read as corrected below.

In the drawings, Sheets 1 and 2, line 1, for "R. J. KOPE", in each occurrence" read -- R. J. KOPF --; column 3, line 8, for "perforrmation" read -- perforation --.

Signed and sealed this 27th day of January 1959.

(SEAL)

Attest:
KARL H. AXLINE
Attesting Officer

ROBERT C. WATSON
Commissioner of Patents